(12) United States Patent
Kim et al.

(10) Patent No.: US 12,517,769 B2
(45) Date of Patent: Jan. 6, 2026

(54) PARALLEL OVERLAPPING BURST LOAD OPERATIONS

(71) Applicant: REBELLIONS INC., Seongnam-si (KR)

(72) Inventors: Hyunho Kim, Seongnam-si (KR); Jinseok Kim, Seongnam-si (KR); Jinwook Oh, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 18/389,680

(22) Filed: Dec. 19, 2023

(65) Prior Publication Data

US 2024/0320059 A1   Sep. 26, 2024

(30) Foreign Application Priority Data

Mar. 20, 2023   (KR) .................. 10-2023-0035788

(51) Int. Cl.
*G06F 9/50* (2006.01)
*G06F 9/30* (2018.01)
*G06F 9/38* (2018.01)

(52) U.S. Cl.
CPC ........ *G06F 9/5083* (2013.01); *G06F 9/30043* (2013.01); *G06F 9/3824* (2013.01); *G06F 9/3834* (2013.01); *G06F 9/3851* (2013.01); *G06F 9/3885* (2013.01); *G06F 9/3856* (2023.08); *G06F 9/3867* (2013.01)

(58) Field of Classification Search
CPC .. G06F 9/5083; G06F 9/3851; G06F 9/30043; G06F 9/3824; G06F 9/3834; G06F 9/3885; G06F 9/3856; G06F 9/3867
See application file for complete search history.

(56) References Cited

U.S. PATENT DOCUMENTS

| | | | | |
|---|---|---|---|---|
| 5,557,578 A | * | 9/1996 | Kelly | G11C 11/40603 365/222 |
| 5,715,476 A | * | 2/1998 | Kundu | G06F 13/28 710/35 |
| 6,085,300 A | * | 7/2000 | Sunaga | G11C 7/1018 365/189.04 |
| 6,205,084 B1 | * | 3/2001 | Akaogi | G11C 7/222 365/194 |

(Continued)

FOREIGN PATENT DOCUMENTS

| | | |
|---|---|---|
| JP | 5-298091 A | 11/1993 |
| KR | 10-2011-0075297 A | 7/2011 |

OTHER PUBLICATIONS

Office Action for KR 10-2023-0035788 by Korean Intellectual Property Office dated Feb. 26, 2025.

*Primary Examiner* — Benjamin C Wu
(74) *Attorney, Agent, or Firm* — BROADVIEW IP LAW, PC

(57) ABSTRACT

A method for processing tasks in parallel is performed by at least one processor, and includes performing a first task associated with a first instruction, determining whether the first instruction is a burst load instruction, in response to determining that the first instruction is the burst load instruction, acquiring a second instruction, and performing a second task associated with the acquired second instruction, in which the first task and the second task are performed in parallel.

16 Claims, 10 Drawing Sheets

(56) References Cited

U.S. PATENT DOCUMENTS

| | | | | |
|---|---|---|---|---|
| 6,321,310 B1* | 11/2001 | McCarthy | G06F 13/28 | 710/33 |
| 6,330,636 B1* | 12/2001 | Bondurant | G11C 7/1066 | 711/104 |
| 6,513,089 B1* | 1/2003 | Hofmann | G06F 13/28 | 710/110 |
| 6,654,848 B1* | 11/2003 | Cleveland | G11C 16/26 | 365/230.03 |
| 6,756,986 B1* | 6/2004 | Kuo | G09G 5/393 | 345/422 |
| 6,854,040 B1* | 2/2005 | Bartoli | G11C 7/1033 | 365/230.09 |
| 7,383,424 B1* | 6/2008 | Olgiati | G06F 15/16 | 712/228 |
| 7,984,204 B2* | 7/2011 | Butter | G06F 13/28 | 710/22 |
| 9,653,151 B1* | 5/2017 | Ong | H10B 99/20 | |
| 10,275,352 B1* | 4/2019 | Balakrishnan | G11C 16/10 | |
| 10,296,230 B1* | 5/2019 | Balakrishnan | G06F 3/0659 | |
| 2008/0165589 A1* | 7/2008 | Hung | G11C 7/1072 | 365/194 |
| 2008/0301391 A1* | 12/2008 | Oh | G06F 13/28 | 711/E12.078 |
| 2010/0061156 A1* | 3/2010 | Sunaga | G11C 11/4076 | 365/189.05 |
| 2011/0161637 A1 | 6/2011 | Sihn et al. | | |
| 2013/0332681 A1* | 12/2013 | Miller | G06F 3/0659 | 711/154 |
| 2014/0047155 A1* | 2/2014 | Zheng | G06F 13/1678 | 710/310 |
| 2018/0225124 A1* | 8/2018 | Gupta | G06F 9/30076 | |
| 2019/0050316 A1* | 2/2019 | Kim | G06F 3/0619 | |
| 2019/0155759 A1* | 5/2019 | Connolly | G06F 13/1642 | |
| 2019/0196996 A1* | 6/2019 | Balakrishnan | G06F 13/30 | |
| 2019/0205244 A1* | 7/2019 | Smith | G06F 3/065 | |
| 2021/0124582 A1* | 4/2021 | Kerr | G06F 9/3009 | |
| 2021/0173702 A1* | 6/2021 | Garg | G06F 9/3836 | |
| 2021/0294515 A1* | 9/2021 | Kumar | G06F 3/0659 | |
| 2023/0289063 A1* | 9/2023 | Hsieh | G06F 13/4243 | |
| 2023/0305744 A1* | 9/2023 | Muchherla | G06F 3/0604 | |

* cited by examiner

PARALLEL OVERLAPPING BURST LOAD OPERATIONS

CROSS-REFERENCE TO RELATED APPLICATION

This application claims priority under 35 U.S.C § 119 to Korean Patent Application No. 10-2023-0035788, filed in the Korean Intellectual Property Office on Mar. 20, 2023, the entire contents of which are hereby incorporated by reference.

TECHNICAL FIELD

The present disclosure relates to a method for processing tasks in parallel, and specifically, to a method and system for processing tasks in parallel in a processing system operating based on instructions.

BACKGROUND

A processing system operating based on instructions loads data and sends the results of execution/operation based on the loaded data to a designated destination. To increase the throughput of a processing system that operates based on instructions, pipeline may be used. Pipelining is a technique to improve the performance of a processing system by continuously processing data.

However, when a plurality of burst load instructions in a pipeline structure are fetched, the processing system must load multiple data associated with the burst load instructions during a plurality of cycles. Meanwhile, before the loading of all data associated with the burst load instruction completes, a stall may occur and the processing system waits without processing subsequent processes (e.g., modulation operation process) associated with the burst load instruction. If the stall occurs, the throughput of the processing system may decrease.

SUMMARY

In order to solve the problems described above, the present disclosure provides a method for, a non-transitory computer-readable recording medium for storing instructions for, and an apparatus (system) for processing tasks in parallel.

The present disclosure may be implemented in a variety of ways, including methods, apparatus (systems) and/or non-transitory computer readable storage media storing instructions.

A method for processing tasks in parallel, in which the method may be performed by at least one processor and may include performing a first task associated with a first instruction, determining whether the first instruction is a burst load instruction, in response to determining that the first instruction is the burst load instruction, acquiring a second instruction, and performing a second task associated with the acquired second instruction, in which the first task and the second task may be performed in parallel.

In addition, the second instruction may be the burst load instruction, and a difference between a burst size of the second instruction and a burst size of the first instruction may be within a threshold range, and the performing the second operation may include generating a plurality of requests based on the burst size of the second instruction.

In addition, the second task may be generated in a pipeline structure that includes a plurality of instructions associated with the generating the plurality of requests and a plurality of instructions associated with executing the plurality of requests.

In addition, the generating the plurality of requests may include identifying a destination associated with the second instruction, and storing the generated plurality of requests in a request queue, which is associated with the identified destination, of the plurality of request queues.

In addition, the method for processing tasks in parallel may further include, after the generating the plurality of requests, identifying a storage area which is associated with the identified destination, of a plurality of storage areas, and storing, in the identified storage area, data issued based on the requests stored in the request queue associated with the destination.

In addition, the second task may start after a predetermined cycle from a cycle in which the first task starts.

In addition, the method for processing tasks in parallel may further include, after the performing the second task, acquiring a third instruction, and performing a third task associated with the acquired third instruction, in which the first task and the third task may be performed in parallel.

In addition, the acquiring the third instruction may include in response to determining that a burst load instruction with a different destination from each of the first instruction and the second instruction is waiting, determining the waiting burst load instruction to be the third instruction, fetching the determined third instruction, and decoding the fetched third instruction.

In addition, each of the first instruction, the second instruction, and the third instruction may be an instruction with a different destination to each other.

In addition, the second task and the third task may start before a fourth task for modulating data written in a cache is performed.

In addition, the method for processing tasks in parallel may further include, after the performing the second task, in response to data being written to the cache, performing a fourth task to modulate the written data, in which the first task and the third task may be performed in parallel.

A processing system may include a memory that stores data associated with at least one instruction, and at least one load unit configured to perform an access operation to the memory, in which in response to a first task associated with a burst load instruction being performed, the at least one load unit may be configured to perform an additional second task, and perform the first task and the second task in parallel.

According to some examples of the present disclosure, a plurality of tasks can be processed in parallel, which can significantly improve the throughput of the processing system.

According to some examples of the present disclosure, when the first task associated with the burst load instruction is performed, a second task having a destination different from that of the first task is additionally performed, so that stalls occurring in the processing system can be minimized or eliminated.

According to some examples of the present disclosure, additional burst load instructions having a size difference within a threshold range of the size of the burst load instruction can be performed in parallel, so that the performance of the processing system can be maximized.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
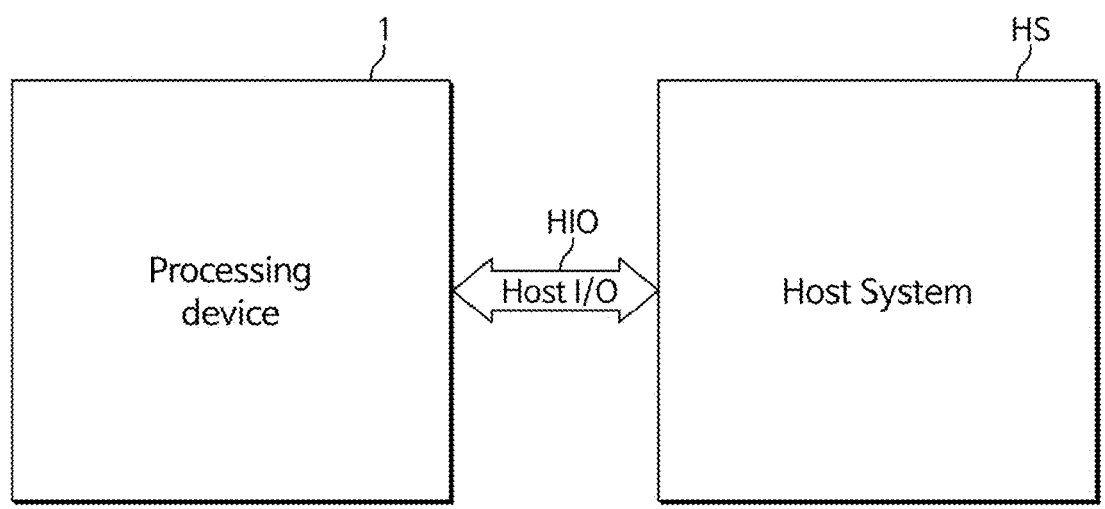
FIG. 1 is a block diagram provided to explain a processing system.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

A "module" or "unit" may be implemented as a processor and a memory, or may be implemented as a circuit (or circuitry). The term "circuit (or circuitry)" may refer to a circuit in hardware, but may also refer to a circuit in software. The "processor" should be interpreted broadly to encompass a general-purpose processor, a Central Processing Unit (CPU), a microprocessor, a Digital Signal Processor (DSP), a controller, a microcontroller, a state machine, etc. Under some circumstances, the "processor" may refer to an application-specific integrated circuit (ASIC), a programmable logic device (PLD), a field-programmable gate array (FPGA), etc. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or marking data storage, registers, etc. The memory is said to be in electronic communication with a processor if the processor can read information from and/or write information to the memory. The memory integrated with the processor is in electronic communication with the processor.

In the present disclosure, "each of a plurality of A" may refer to each of all components included in the plurality of A, or may refer to each of some of the components included in a plurality of A.

In addition, terms such as first, second, A, B, (a), (b), etc. used in the following examples are only used to distinguish certain components from other components, and the nature, sequence, order, etc. of the components are not limited by the terms.

In addition, in the following examples, if a certain component is stated as being "connected," "combined" or "coupled" to another component, it is to be understood that there may be yet another intervening component "connected," "combined" or "coupled" between the two components, although the two components may also be directly connected or coupled to each other.

In addition, as used in the following examples, "comprise" and/or "comprising" does not foreclose the presence or addition of one or more other elements, steps, operations, and/or devices in addition to the recited elements, steps, operations, or devices.

Before describing various examples of the present disclosure, terms used will be explained.

In the examples of the present disclosure, an "instruction" may be at least one instruction executed by the processing system. For example, the instruction may be an instruction based on machine language (assembly language).

In the examples of the present disclosure, a "task" may be a unit of work performed based on at least one instruction. For example, the processing system may perform a task based on at least one instruction. Performing a task may include at least one of loading data, executing the loaded data, storing the execution result, or sending the stored result to a destination.

Hereinafter, various examples of the present disclosure will be described in detail with reference to the accompanying drawings.

FIG. 1 is a block diagram provided to explain a processing system. Referring to FIG. 1, a processing system may include a processing device 1, a host system (HS), and a host interface (HIO).

The processing device 1 may be a device that performs instruction-based operations. The processing device 1 may include a neural processing unit (NPU), a graphics processing unit (GPU), a central processing unit (CPU), and other types of processing units. If the processing device 1 includes a neural processing unit, the processing device 1 may be a device that performs operations using an artificial neural network. For example, the processing device 1 may be a device specialized for performing deep learning operation tasks.

The host system HS may be a system that instructs the processing device 1 to perform operation tasks and retrieves the results of the operation tasks.

The host interface (HIO) may send data and control signals between the processing device 1 and the host system (HS). The host interface (HIO) may transfer commands and data from the host system (HS) to the processing device 1, for example, and the processing device 1 may perform the operation tasks accordingly. If the processing device 1 completes the operation task, it may transfer the result to the host system HS through an interrupt request. For example, the host interface (HIO) may be PCI Express (PCIe), but is not limited thereto.

Figure 2:
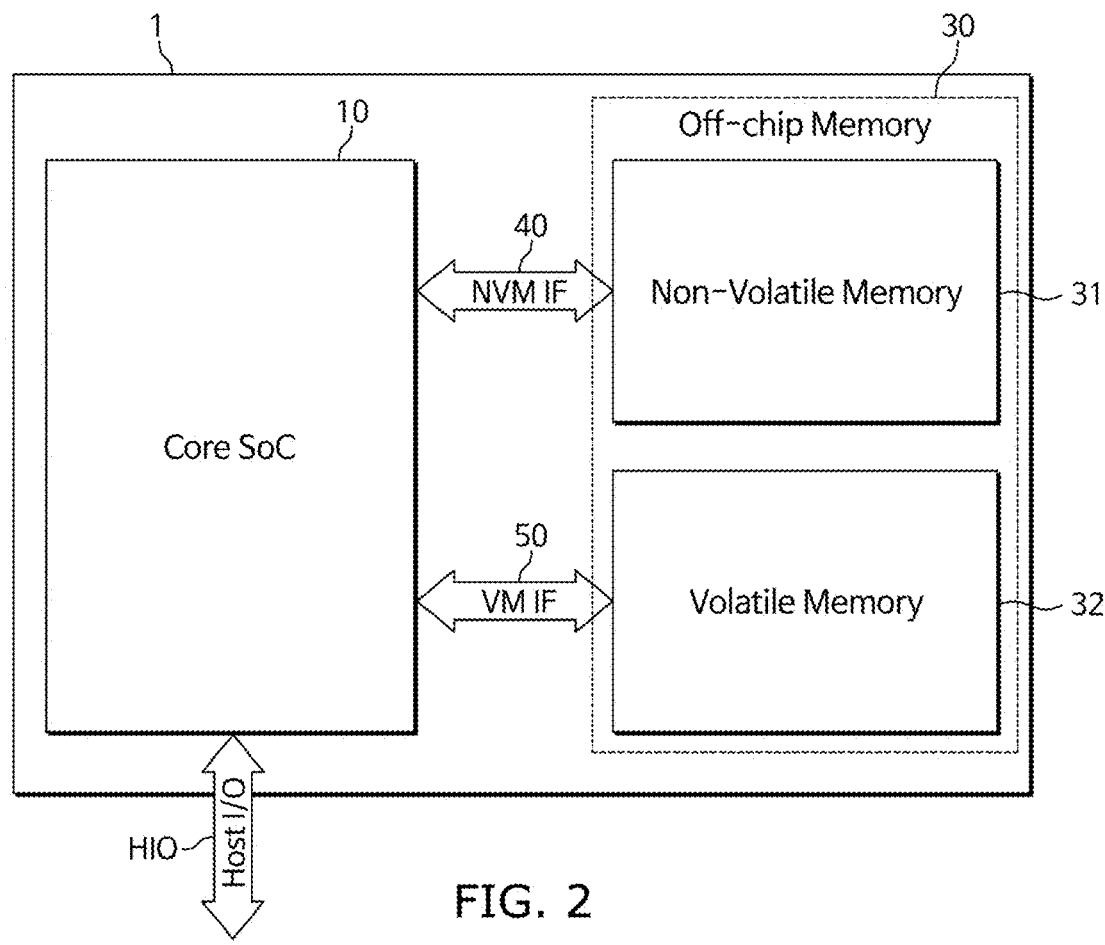
FIG. 2 is a block diagram provided to explain in detail the neural processing device of FIG. 1.

FIG. 2 is a block diagram provided to explain in detail the neural processing device 1 of FIG. 1. Referring to FIG. 2, the processing device 1 may include a core SoC 10, an off-chip memory 30, a non-volatile memory interface 40, and a volatile memory interface 50. FIG. 2 is only an example of the processing device 1, and it does not illustrate only the essential configurations or the entire configuration of the processing device 1, and accordingly, at least some of the illustrated configurations may be omitted and/or other configurations may be further included.

The core SoC 10 may be a System on Chip device including at least one processor. The core SoC 10 may distribute/manage tasks for performing operation tasks and manage memory allocation. The core SoC 10 is an artificial intelligence operation unit and may include an accelerator. For example, the core SoC 10 may include one or more processing units and/or neural processors specialized for matrix operations for artificial intelligence applications.

As another example, the core SoC 10 may include at least one of a Central Processing Unit (CPU), a Graphics Processing Unit (GPU), a graphics processing unit (GPU), a field programmable gate array (FPGA), or an application-specific integrated circuit (ASIC). However, aspects are not limited to the above. FIG. 1 illustrates that the core SoC 10 is a single chip, but this is merely for convenience of explanation and aspects are not limited thereto. For example, the core SoC 10 may be implemented as a separate single or plurality of chips, or as part of a System on Chip (SoC) combined on a system.

The core SoC 10 may exchange data with other external operation units through a separate external interface (e.g., host interface, etc.). In addition, the core SoC 10 may be connected to a non-volatile memory 31 and a volatile memory 32 through the non-volatile memory interface 40 and the volatile memory interface 50, respectively.

The off-chip memory 30 may be a memory placed outside the chip of the core SoC 10. An off-chip memory 200 may be a device where data associated with instructions is stored or loaded. The off-chip memory 30 may include the non-volatile memory 31 and the volatile memory 32.

The non-volatile memory 31 may be a memory that continuously retains stored information even when there is no power supply. For example, the non-volatile memory 31 may include at least one of a Read-Only Memory (ROM), a Programmable Read-Only Memory (PROM), an Erasable Alterable ROM (EAROM), an Erasable Programmable Read-Only Memory (EPROM), an Electrically Erasable Programmable Read-Only Memory (EEPROM) (e.g., a NAND flash memory, a NOR flash memory), an Ultra-Violet Erasable Programmable Read-Only Memory (UVEPROM), a Ferroelectric Random Access Memory (FeRAM), a Magnetoresistive Random Access Memory (MRAM), a Phase-change Random Access Memory (PRAM), a silicon-oxide-nitride-oxide-silicon (SONOS), a Resistive Random Access Memory (RRAM), a Nanotube Random Access Memory (NRAM), a magnetic computer storage devices such as hard disks, and a magnetic computer storage device (e.g., hard disk, diskette drive, magnetic tape), an optical disk drive, or 3D XPoint memory. However, aspects are not limited to the above.

Unlike the non-volatile memory 31, the volatile memory 32 may be a memory that continuously requires power to maintain stored information. For example, the volatile memory 32 may include at least one of a Dynamic Random Access Memory (DRAM), a Static Random Access Memory (SRAM), a Synchronous Dynamic Random Access Memory (SDRAM), and a Double Data Rate SDRAM (DDR SDRAM). However, aspects are not limited to the above.

For example, the non-volatile memory interface 40 may include at least one of a Parallel Advanced Technology Attachment (PATA), a Small Computer System Interface (SCSI), a Serial Attached SCSI (SAS), a Serial Advanced Technology Attachment (SATA), and a PCI Express (PCIe). However, aspects are not limited to the above.

For example, the volatile memory interface 50 may be at least one of Single Data Rate (SDR), Double Data Rate (DDR), Quad Data Rate (QDR), eXtreme Data Rate (XDR), and Octal Data Rate. However, aspects are not limited to the above.

Figure 3:
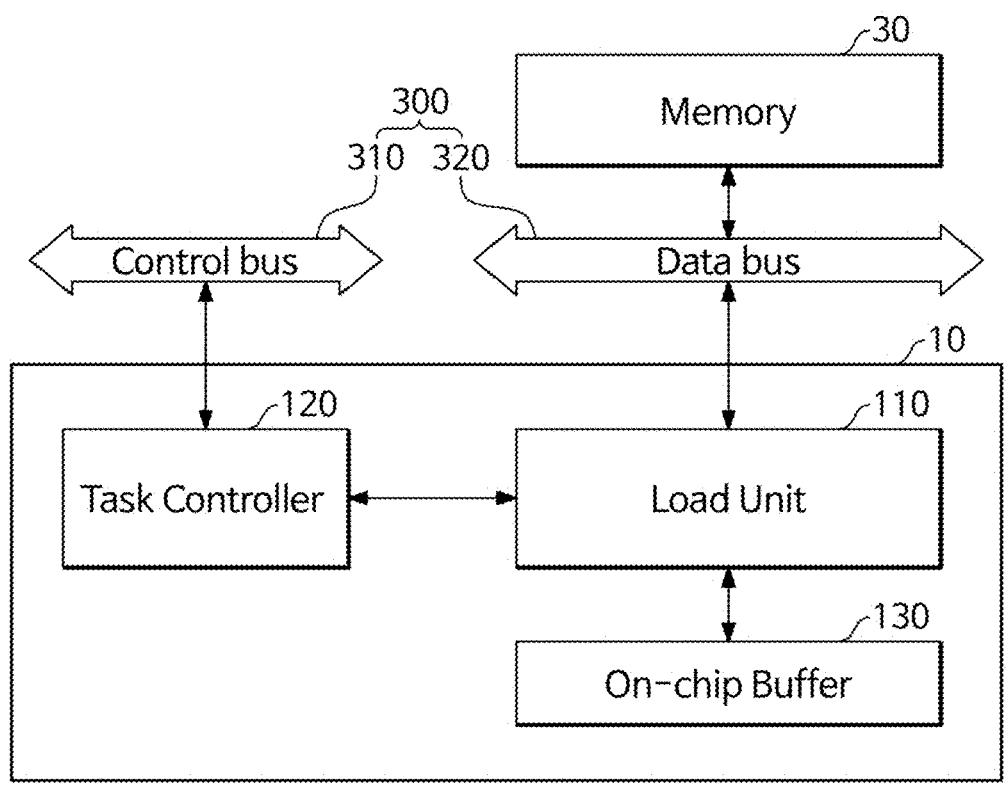
FIG. 3 is a block diagram provided to explain in detail the core SoC of FIG. 1.

FIG. 3 is a block diagram provided to explain in detail the core SoC 10 of FIG. 1. As illustrated in FIG. 3, the core SoC 10 may include a load unit 110, a task controller 120, and an on-chip buffer 130.

An external interface 300 may include a control bus 310 and a data bus 320. The external interface 300 may be included in the non-volatile memory interface 40 and/or the volatile memory interface 50 of FIG. 2. The control bus 310 may be a bus that transfers control signals, and the data bus 320 may be a bus that transfers input data and output data. The control bus 310 may send a control signal associated with the load to the task controller 120. Additionally or alternatively, a control signal associated with a store may be sent to the task controller 120. The control signal may be sent to the task controller 120 based on data loaded into the off-chip memory 200, or may be received by the host system and sent to the task controller 120.

The task controller 120 may be a module for controlling tasks. For example, the task controller 120 may be a module for generating or distributing tasks required for operation. Upon receiving a control signal associated with a work load, the task controller 120 may send an instruction to the load unit 110. For example, the task controller 120 may send at least one of at least one load instruction or a waiting load instruction. In addition, upon receiving a control signal associated with a data modulation, the task controller 120 may send an instruction associated with the data modulation to the load unit 110. The instructions associated with the data modulation may be associated with instructions for merging data, shuffling data, etc. For example, the instructions associated with data modulation may be associated with matrix operations of an artificial neural network.

The load unit 110 may be configured to perform an access operation to the memory 30. The load unit 110 may perform a task associated with the load based on at least one of the load instruction or the waiting load instruction received from the task controller 120. The load instruction may refer to an instruction for a program or data for a task currently executed by the core SoC 10, and the waiting load instruction may refer to an instruction for a program or data for a task to be executed later by the core SoC 10. There may be a plurality of waiting load instructions.

An example of each of the load instruction and the waiting load instruction may include the following:

Dscrptr{src, dst, burst size, #burst}

In this case, src may refer to a source, that is, an address of data to be loaded, and dst may refer to a destination, that is, a destination address to send data to. burst size may refer to a burst size, that is, the division size, and #burst may refer to a burst number, that is, the number of divisions. The burst size and the burst number may be used when the instruction is a burst load instruction.

The task controller 120 may send a plurality of instructions to the load unit 110. For example, the task controller 120 may sequentially send a plurality of burst load instructions to the load unit 110 according to the burst number order. At this time, some or all of the plurality of burst load instructions may be sent to the load unit 110 as the waiting load instructions. The load unit 110 may fetch an instruction received from the task controller 120, decode the fetched instruction, and then execute the instruction based on the decoded data. If there are a plurality of waiting load instructions, the load unit 110 may sequentially process the waiting load instructions based on priority. The load unit 110 may fetch, decode, and/or execute at least one instruction so as to perform a task associated with the at least one instruction. In addition, the load unit 110 may modulate data through a modulation operation such as a matrix operation and store, as a result, the modulated data in the on-chip buffer 130. For example, the load unit 110 may receive an instruction associated with data modulation from the task controller 120 and extract data written to the cache. The load unit 110 may modulate the extracted data and store the modulated data in the on-chip buffer 130.

The load unit 110 may fetch and decode the first instruction to perform a first task associated with the first instruction. While performing the first task, if the first instruction is the burst load instruction, the load unit 110 may acquire a waiting second instruction, and perform a second task associated with the acquired second instruction. The waiting second instruction may be the waiting load instruction.

The load unit 110 may control such that the first task and the second task are performed in parallel. That is, if the first instruction is determined to be the burst load instruction, in order to prevent a stall from occurring during the performance of the first task, the load unit 110 may acquire a second instruction with a different destination from the first instruction and perform the second task associated with the second instruction in parallel. The second instruction may be the burst load instruction and may be received from the task controller 120.

If the first instruction is a burst load instruction having a burst size equal to or greater than a predetermined threshold, the load unit 110 may perform an additional second task in parallel. That is, if the first instruction associated with the burst first task is the burst load instruction, but if the burst size of the first instruction is less than the threshold, the load unit 110 may perform only the first task without performing additional tasks in parallel.

An example of a stall that occurs while the task associated with the burst load instruction is being performed will be described with reference to FIG. 4.

Figure 4:
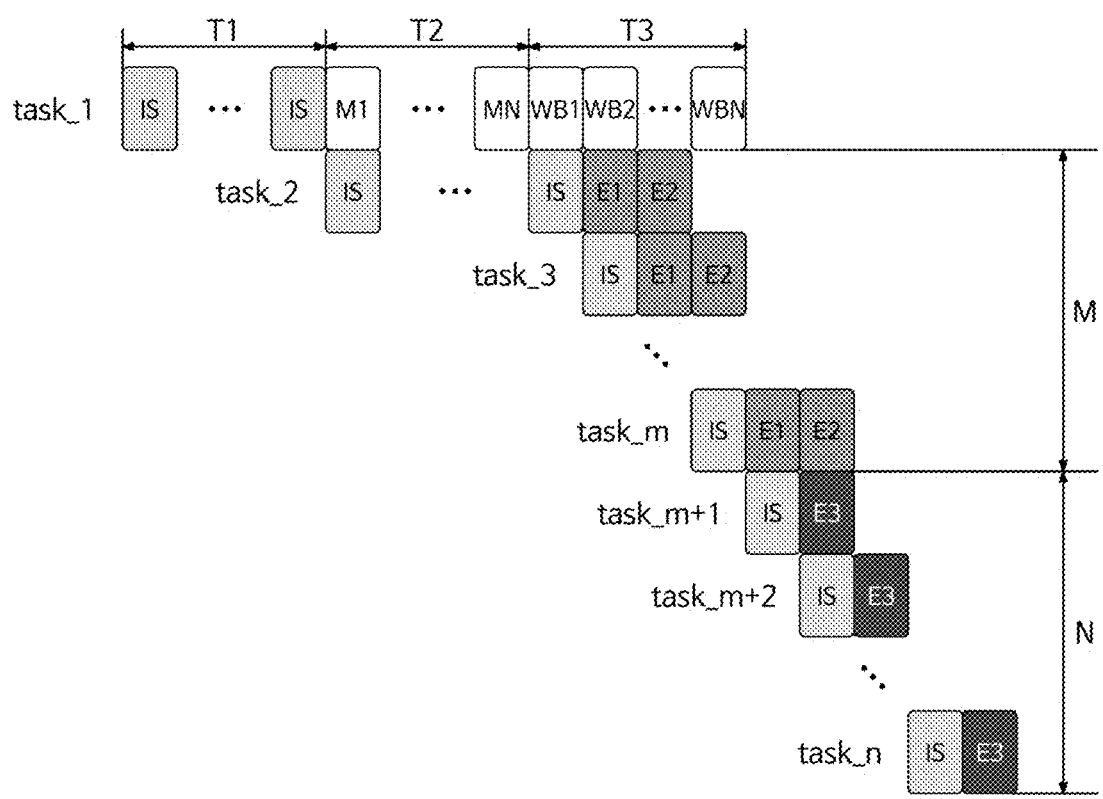
FIG. 4 is a diagram provided to explain a stall that occurs while a task associated with a burst load instruction is being performed.

FIG. 4 is a diagram provided to explain a stall that occurs while the task associated with the burst load instruction is being performed. In FIG. 4, the first task (task_1) may be a task associated with cash data load (hereinafter, referred to as a "load task"), the second task (task_2) to the m-th task (task_m) may be tasks (hereinafter referred to as "data modulation task") associated with data modulation, and the m+1-th task (task_m+1) to the n-th task (task_n) may be tasks (hereinafter referred to as "transmission task") for sending the modulated data. The number of data modulation tasks (task_2 to task_m) and the number of transmission tasks (task_m+1 to task_n) may be the same as each other. FIG. 4 illustrates that the number of data modulation tasks (task_2 to task_m) is M (where, M is a natural number), and the number of transmission tasks (task_m+1 to task_n) is N (where, N is a natural number). In addition, the number (M) of data modulation tasks (task_2 to task_m) and the number (N) of transmission tasks (task_m+1 to task_n) may be different from each other. Each task may be generated in a pipeline structure that includes a plurality of instructions. In addition, each of T1, T2, and T3 illustrated in FIG. 4 may be associated with a task time including a plurality of cycles.

The data modulation tasks (task_2 to task_m) may be the tasks associated with modulating data, such as merging, shuffling, etc. For example, the data modulation tasks (task_2 to task_m) may be the tasks associated with the matrix operations of an artificial neural network. The data modulation tasks (task_2 to task_m) may be performed when an instruction for modulating data is acquired. That is, if an instruction associated with data modulation is received from the task controller and fetched, the data modulation tasks (task_2 to task_m) may be performed. Data subject to modulation may be acquired from a cache.

As illustrated in FIG. 4, the first task (task_1) associated with data load may be performed. The first task (task_1) may start as a plurality of burst load instructions are sequentially fetched and decoded.

During T1 illustrated in FIG. 4, a plurality of burst load instructions may be issued, and requests may be stored in queue based on the issued data. After a plurality of requests associated with the plurality of burst load instructions are stored in queue, a waiting time required to read data based on the requests may occur during T2. The waiting time may be the waiting time required to access the memory based on the source address included in the instruction and acquire necessary data. In addition, during T3, data associated with execution results based on the requests may be written to the cache. If the size of the burst load instruction is "8" (for example, when there are 8 burst load instructions), 24 cycles may be required until the operation result associated with the load is written to the cache.

Based on the data acquired from the cache, if a second task (task_2) for performing data modulation is waiting (i.e., if a request associated with an instruction for data modulation is stored in the queue), instructions E1 and E2 for executing the data modulation change may be delayed. As illustrated in FIG. 4, after the data associated with the execution result associated with the first burst load instruction is written to the cache, instructions E1 and E2 associated with the second task task_2 may be executed based on the data acquired from the cache. That is, if the request associated with the second task (task_2) is stored in the queue, but if data is not written to the cache, the instructions E1 and E2 associated with the second task (task_2) may be in a waiting state.

After WB1 instruction included in the first task (task_1) is complete and data is written to the cache, the first instruction (E1) and the second instruction (E2) associated with the second task (task_2) may be sequentially executed. The first instruction (E1) may be an instruction for modulating data extracted from the cache, and the second instruction (E2) may be an instruction for writing the modulated data.

Meanwhile, after the WB2 instruction is complete and data is written to the cache, a third task (task_3) associated with another data modulation task may be performed.

In addition, at least one of the plurality of tasks (task_m+1 to task_n) for sending the data modulation result to the destination may be performed only if at least one of the plurality of tasks (task_2 to task_m) associated with the data modulation is complete. Taking FIG. 4 as an example, after the second task (task_2) for modulating data written in the cache based on the first burst load instruction is complete, the m+1-th task (task_m+1) for sending the modulated data to the destination may be performed. The third instruction (E3) included in the transmission-related tasks (task_m+1 to task_n) may be an instruction associated with sending the modulation result to the destination.

As illustrated in FIG. 4, until the task (task_1) associated with execution in the first task associated with data load progresses, the tasks (task_2 to task_m) associated with data modulation and the tasks (task_m+1 to task_n) associated with data transmission are in a waiting state. That is, the tasks (task_2 to task_m) associated with data modulation may be performed depending on the first task (task_1), and the tasks (task_m+1 to task_n) associated with data transmission may be performed in association with the tasks (task_2 to task_m) associated with data modulation. Accordingly, as the task time of the first task (task_1) increases, the waiting state of the subsequent tasks (task_2 to task_n) increases, resulting in a stall in the processing system.

In this way, burst load instructions may cause a stall, and if a stall occurs, the performance of the processing system may deteriorate. Therefore, an instruction structure for processing tasks in parallel and a processing system for processing this instruction structure are necessary.

Figure 5:
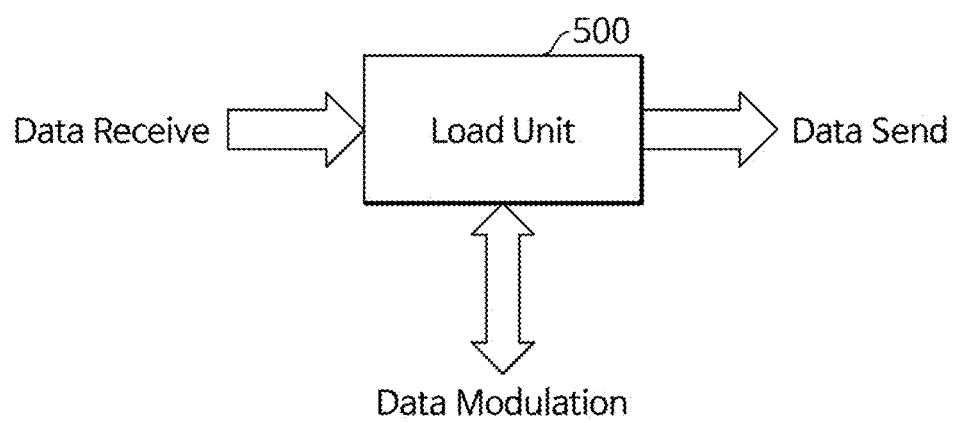
FIG. 5 is a schematic diagram provided to explain a load unit that processes a plurality of tasks in parallel.

FIG. 5 is a schematic diagram provided to explain a load unit 500 that processes a plurality of tasks in parallel. The load unit 500 illustrated in FIG. 5 may correspond to the load unit 110 illustrated in FIG. 3. The load unit 500 may perform data reception, data modulation, and data transmission in parallel. The load unit 110 may be implemented or configured as a circuit. The load unit 110 may also be called a load unit circuit.

The load unit 500 may perform a load task for loading received data and a data modulation task for modulating the loaded data in parallel. That is, the load unit 500 may perform the data modulation task in parallel while performing the load task. Additionally, while performing the load task and/or the data modulation task, the load unit 500 may perform, in parallel, the transmission task for sending the data modulated based on the data modulation task to the destination. In some examples, the load unit 500 may perform a plurality of tasks with different destinations in parallel.

Once starting to perform a specific task, the load unit 500 may determine whether an instruction associated with the specific task is a burst load instruction. If the instruction associated with the specific task is determined to be the burst load instruction, the load unit 500 may perform an additional task, in which the load unit 500 may perform the additional task and the task already in progress in parallel.

Figure 6:
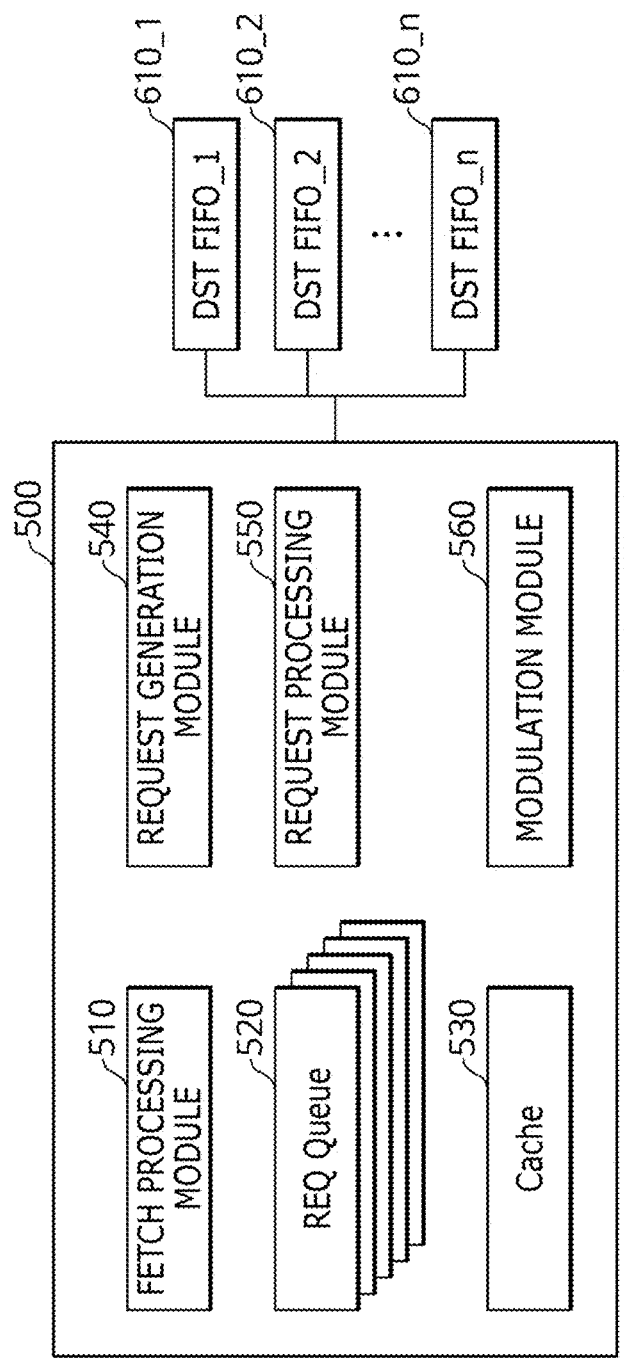
FIG. 6 is a block diagram illustrating the detailed configuration of a load unit.

FIG. 6 is a block diagram illustrating a detailed configuration of the load unit 500. As illustrated in FIG. 6, the load unit 500 may include a fetch processing module 510, a plurality of request queues 520, a cache 530, a request generation module 540, a request processing module 550, and a modulation module 560.

The fetch processing module 510 may fetch and decode the instruction received from the task controller, generate a signal associated with the received instruction, and send the generated signal to the request generation module 540. According to some examples, the fetch processing module 510 may receive a plurality of instructions from the task controller, sequentially fetch and decode the received load instructions, and generate a plurality of signals. The plurality of instructions received from the task controller may include a waiting load instruction.

The plurality of request queues 520 may store at least one request in a first-in-first-out data structure. The request stored in the request queues 520 may be issued. Issuing herein may involve sending the data associated with the request to a designated destination. The destination herein may be associated with at least one of memory, register, buffer, cache, queue, host system, etc.

The plurality of request queues 520 may be associated with different destinations. For example, a request associated with a first destination may be stored in a first request queue, and a request associated with a second destination may be stored in a second request queue. Because the request queues 520 are classified based on the destinations, a plurality of tasks with different destinations may be performed in parallel and independently.

The cache 530 is a storage means that may be accessible at high speed and may store execution result data associated with the load task. The cache may include at least one register.

The request generation module 540 may generate a request based on a signal received from the fetch processing module 510 and store the generated request in the request queues 520. The request may include a memory address where the data to be loaded is stored, and a destination address to send the data to. Additionally, the request may include a burst size and a burst number.

The request generation module 540 may identify a destination (i.e., a destination included in the instruction) associated with the received signal and store the generated request in a request queue, of the plurality of request queues 520, which is associated with the identified destination. The request generation module 540 may calculate an entry address based on a Local Register File (LRF) and store the generated request in a storage space associated with the calculated entry address of a plurality of entries included in the request queue. The entry may be associated with a sub-storage area included in the overall storage area allocated to the request queue. For example, the request queue may be divided into entries corresponding to 100 sub-storage areas, and an address may be assigned to each entry. The address of the entry may be used to reserve and reuse the sub-storage area included in the request queue.

The request processing module 550 may sequentially extract the requests stored in the request queues 520 based on priority and execute a plurality of instructions associated with the plurality of extracted requests. For example, the request processing module 550 may load data based on the source address included in the request stored in the request queues 520 and write the result (e.g., operation result) executed based on the loaded data in the cache 530.

The modulation module 560 may perform an operation to modulate data based on the data written in the cache 530, and send the modulated data according to the result of the operation to second storage areas 610_1 to 610_n associated with the destination. Modulating data herein may refer to merging, shuffling, dividing, etc. at least one data stored in the cache 530**. For example, modulating data may involve matrix operations in the artificial neural network.

The modulation module 560 may extract at least one data for modulation from the cache 530, modulates the extracted at least one data, and store the modulated data in a separate first storage area (not illustrated). The separate first storage area may be a dedicated area allocated for data modulation and may include a transpose register file.

The modulation module 560 may send the data included in the first storage area to the second storage areas 610_1 to 610_n associated with the destination. The modulation module 560 may identify a destination associated with the modulated data (that is, a destination associated with the task) and send the modulated data to the second storage areas 610_1 to 610_n associated with the identified destination. That is, the modulation module 560 may issue the data included in the first storage area and control such that the issued data is stored in the second storage areas 610_1 to 610_n associated with the destination. It may be controlled such that, from among the plurality of entries included in the second storage areas 610_1 to 610_n associated with the destination, an entry in which the modulated data is stored may be determined and the modulated data is stored in the storage space associated with the determined entry. For the determination of an entry, reference data (e.g., metadata, etc.) for determining an entry address of the next order may be stored in the load unit 500. The modulation module 560 may determine an entry address for storing the modulated data based on the reference data.

The second storage areas 610_1 to 610_n may be divided into different destinations, and also may store data in a first-in-first-out structure. For example, part or all of the second storage areas 610_1 to 610_n may be included in an on-chip buffer included in the core system. As another example, part or all of the second storage areas 610_1 to 610_n** may be included in the host system.

The request generation module 540 may determine whether the signal received from the fetch processing module 510 is a signal associated with the burst load instruction, and, if it is determined that the signal is a signal associated with a burst load instruction, may determine to perform a parallel processing routine. The request generation module 540 may determine to perform the parallel processing routine, if the size of the burst load instruction exceeds a predetermined threshold.

If the request generation module 540 determines to perform the parallel processing routine, the request generation module 540 may request the fetch processing module 510 to fetch instructions for parallel processing and perform the first task. As the plurality of requests associated with the first task are stored in the request queues 520, instructions associated with the first task may be issued, and the data associated with the first task may be modulated.

In response to receiving an instruction fetch for parallel processing, the fetch processing module 510 may acquire at least one burst load instruction having a different destination from the burst load instruction and having a size within a threshold range for the size of the burst load instruction. The fetch processing module 510 may fetch and decode the acquired burst load instruction, generate an additional signal, and send the generated signal to the request generation module 540. For example, if there are n burst load instructions (where, n is a natural number) that are different in destination from the burst load instruction and have a size within a threshold range for the size of the burst load instruction, the request generation module 540 may send signals corresponding to n to the request generation module 540. The signals corresponding to n may be signals associated with the same burst load instruction, and the number of signals may be determined according to the size of the burst load instruction.

The request generation module 540 may perform, in parallel, at least one additional task based on the additional signal. The request generation module 540 may generate a plurality of requests based on the received signal and store the generated requests in the request queues 520. The plurality of requests stored in the request queues 520 may be associated with additional tasks.

As the request associated with the additional task is stored in the request queues 520, the request processing module 550 may extract a request associated with the additional task from the request queues 520 and perform a write back stage associated with the additional task based on the extracted request.

Meanwhile, there may be a plurality of additional tasks. For example, a plurality of requests associated with three or more tasks may be stored in the request queues 520. For example, at least one request queue associated with a first task may be stored in the first request queue, at least one request queue associated with a second task may be stored in the second request queue, and at least one request queue associated with a third task may be stored in the third request queue. Each of the first, second, and third tasks may have different destinations, and the first, second, and third tasks may be associated with the burst load instruction. In this case, the load unit 500 may process the first, second, and third tasks in parallel based on a plurality of requests stored in the first to third request queues.

As described above, if the instruction associated with the task being performed is the burst load instruction, the load unit 500 may perform the additional task associated with another burst load instruction, while performing a plurality of tasks in parallel.

A method for performing a plurality of tasks in parallel will be described with reference to FIGS. 7 and 8.

Figure 7:
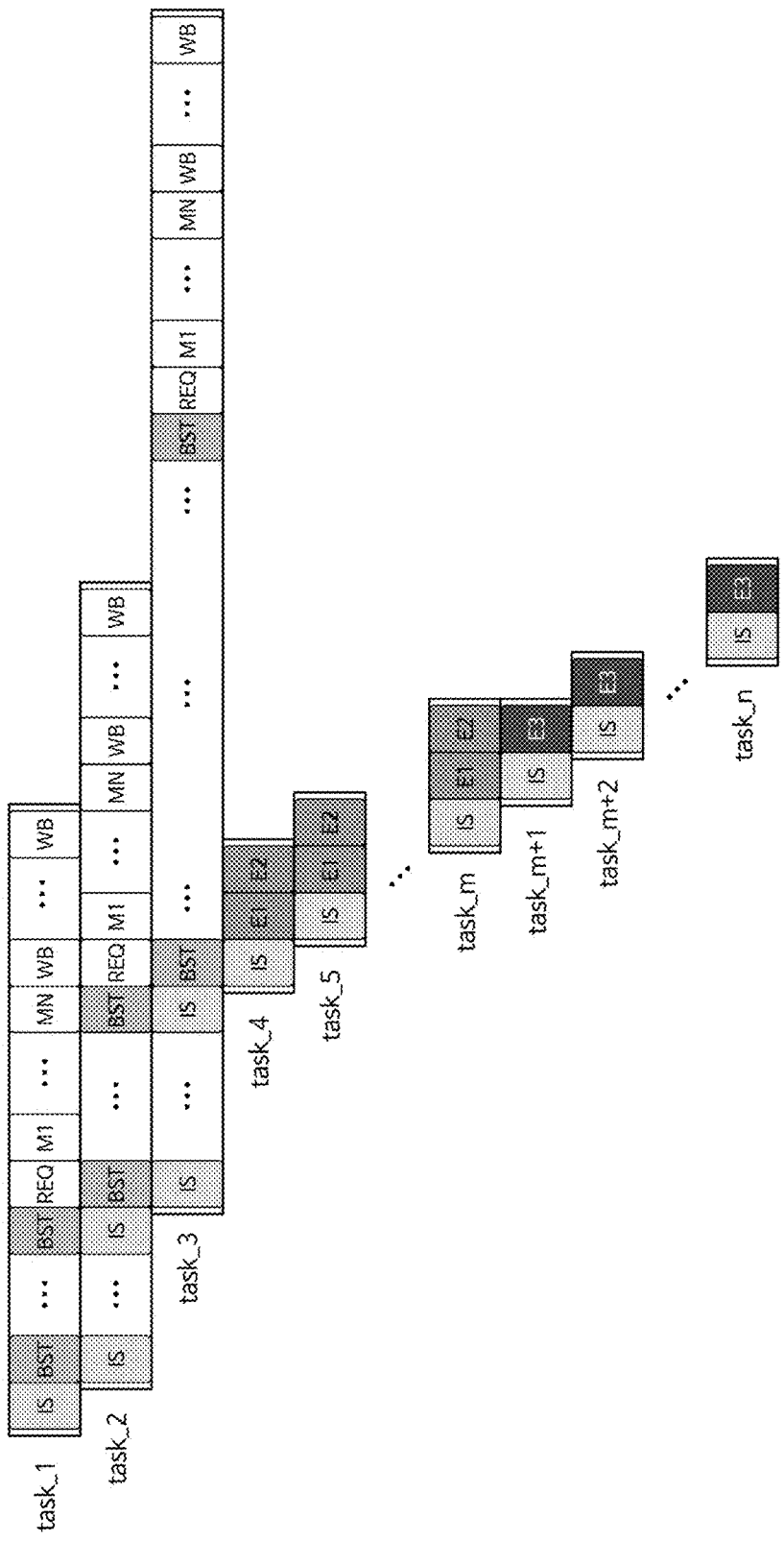
FIGS. 7 and 8 are timing diagrams illustrating a plurality of tasks performed in parallel.

FIG. 7 is a timing diagram illustrating a plurality of tasks performed in parallel. As illustrated in FIG. 7, IS may be an instruction associated with fetching and decoding the instruction acquired from the memory, and generating a signal based on the decoded data. For example, IS may be associated with generating a signal through the fetch processing module of FIG. 6 and transferring the generated signal to the request generation module.

BST may be associated with the burst load instruction. For performing with the burst load instruction, a request associated with the burst load may be generated and stored in the request queues 520. For example, BST may be an instruction performed by the request generation module 540 illustrated in FIG. 6.

REQ may be an instruction associated with issuing a request stored in the request queues 520. REQ may be an instruction performed by the request processing module illustrated in FIG. 6. In addition, MI to MN may be instructions associated with waiting time that occurs when reading data based on a request. WB may be an instruction associated with writing the operation result to the cache. MI to MN and WB may be instructions performed by the request processing module 550 illustrated in FIG. 6.

E1 may be an instruction for executing data modulation, and E2 may be an instruction for writing data modulated by E1 in a separate storage area. In addition, E3 may be an instruction for sending the modulated data to a designated destination. E1 and E2, and E3 may be instructions performed by the modulation module 560 illustrated in FIG. 6.

In FIG. 7, one instruction may be performed in one cycle. In addition, the first task (task_1), the second task (task_2), and the third task (task_3) may be tasks associated with the burst load instruction. Each of the first task (task_1), the second task (task_2), and the third task (task_3) may have different destinations, and accordingly, requests associated with each of the first task (task_1), the second task (task_2), and the third task (task_3) may be stored in different request queues.

The difference between the burst size of the burst load instruction associated with the first task (task_1) and the burst size of the burst load instruction associated with the second task (task_2)/third task (task_3) may be within a threshold range. For example, the burst size of the burst load instruction associated with the second task (task_2)/third task (task_3) may be equal to or greater than the burst size of the burst load instruction associated with the first task (task_1).

The fourth task (task_4) to the m-th task (task_m) may be tasks associated with data modulation. In addition, the m+1th task (task_m+1) to the n-th task (task_n) may be tasks associated with data transmission.

As illustrated in FIG. 7, while the first task (task_1) is being performed, the second task (task_2) and the third task (task_3) may be performed in parallel. The second task (task_2) may start after a predetermined cycle from the cycle in which the first task (task_1) starts. That is, the load unit may determine the start time of the second task (task_2) based on the start time of the first task (task_1). The second task (task_2) and/or the third task (task_3) may start before the fourth task (task_4) to the m-th task (task_m) associated with data modulation.

FIG. 7 illustrates that the second task (task_2) starts in the cycle immediately following the cycle in which the first task (task_1) starts. Likewise, the third task (task_3) may start after a predetermined cycle from the cycle in which the first task (task_1) or the second task (task_2) starts. As illustrated in FIG. 7, the second task (task_2) may start in the next cycle after the IS of the first task (task_1) ends, and the third task (task_3) may start in the next cycle after the IS of the second task (task_2) ends.

The first task (task_1) is a task associated with the burst load instruction, and accordingly, the fourth task (task_4) to m-th tasks (task_m) associated with data modulation have to wait until the data associated with the first task is written to the cache (i.e., until the WB-related instruction is performed). In order to keep the load unit operating even during this waiting time, additional tasks, that is, the second task (task_2) and the third task (task_3) may be performed. In this case, each of the first task (task_1), the second task (task_2), and the third task (task_3) may be performed in parallel.

As illustrated in FIG. 7, while the second task (task_2) and the third task (task_3) are being performed, the fourth task (task_4) to the m-th task (task_m) associated with data modulation may be performed in parallel, and the m+1th task (task_m+1) to the nth task (task_n) associated with data transmission may be performed in parallel.

As described above, a plurality of tasks associated with a plurality of burst load instructions may be performed in parallel, thus minimizing idle time when the load unit is not operating and accordingly minimizing or preventing stall of the processing system.

Meanwhile, a greater number of tasks may be performed in parallel in the load unit based on the number of burst load instructions waiting in the memory.

Figure 8:
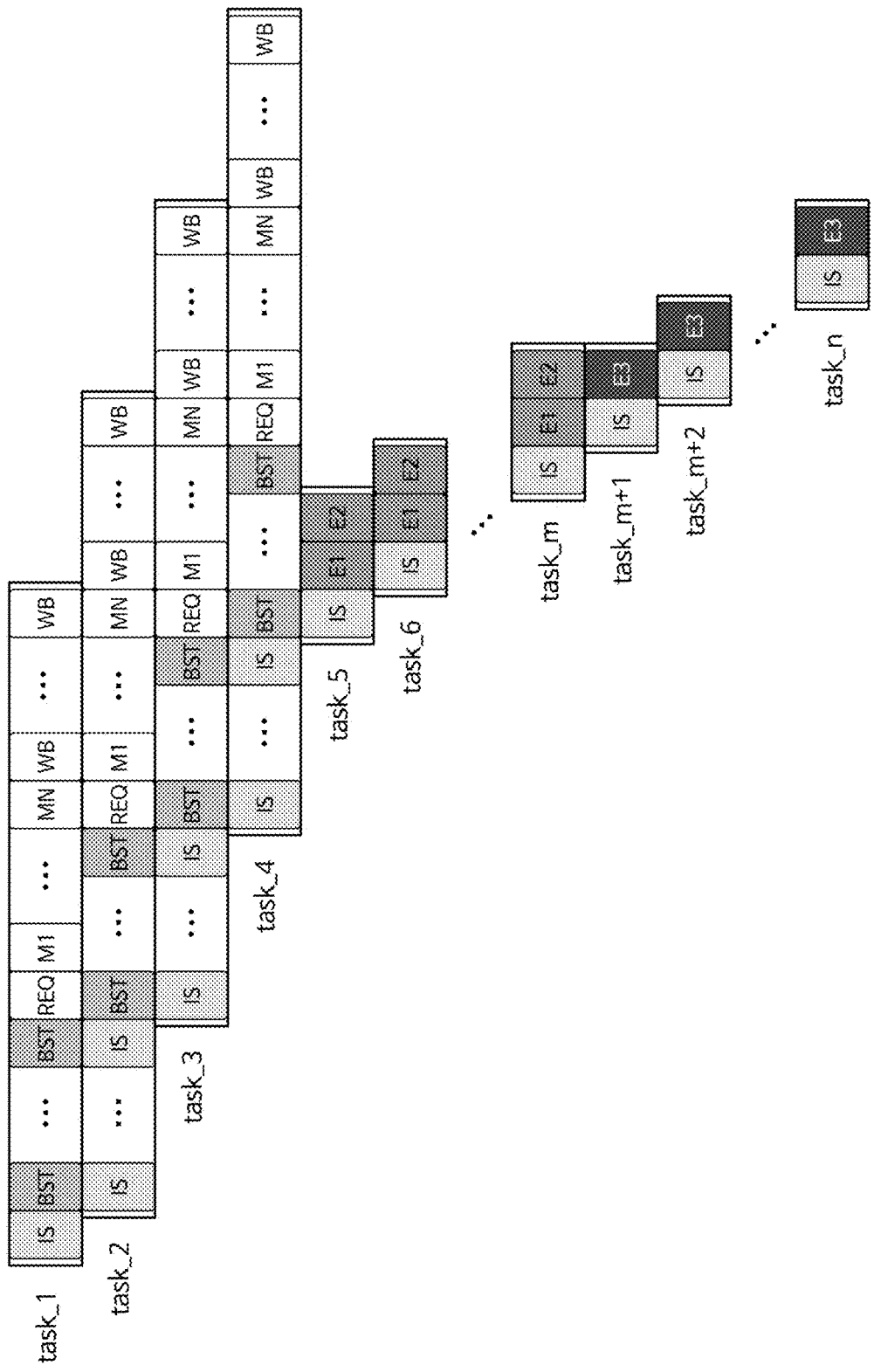

FIG. 8 is a timing diagram illustrating a plurality of tasks performed in parallel. Referring to FIG. 8, the first task (task_1) to the fourth task (task_4) may be the tasks associated with the burst load instruction. Each of the first tasks (task_1) to the fourth tasks (task_4) may have different destinations. The burst load instruction associated with each of the second tasks (task_2) to the fourth task (task_4) may have a burst size that, compared to the burst size of the burst load instruction associated with the first task (task_1), corresponds to a size within the threshold range.

The fifth task (task_5) to the m-th task (task_m) may be the tasks associated with data modulation. In addition, the m+1th task (task_m+1) to the n-th task (task_n) may be tasks associated with data transmission.

As illustrated in FIG. 8, after the first task (task_1) is performed, the second tasks (task_2) to the fourth tasks (task_4) may be performed in parallel. Compared to FIGS. 7 and 8, FIG. 7 illustrates that one task (task_4) associated with the burst load instruction is added.

As illustrated in FIG. 8, while the second tasks (task_2) to the fourth tasks (task_4) are being performed, the fifth task (task_6) to the m-th task (task_m) associated with data modulation may be performed in parallel, and the m+1th task (task_m+1) to the nth task (task_n) associated with data transmission may be performed in parallel. The second task (task 2) to the fourth task (task_4) associated with the additional load task may start before the fifth task (task_4) to the m-th task (task_m) associated with the data modulation.

Figure 9:
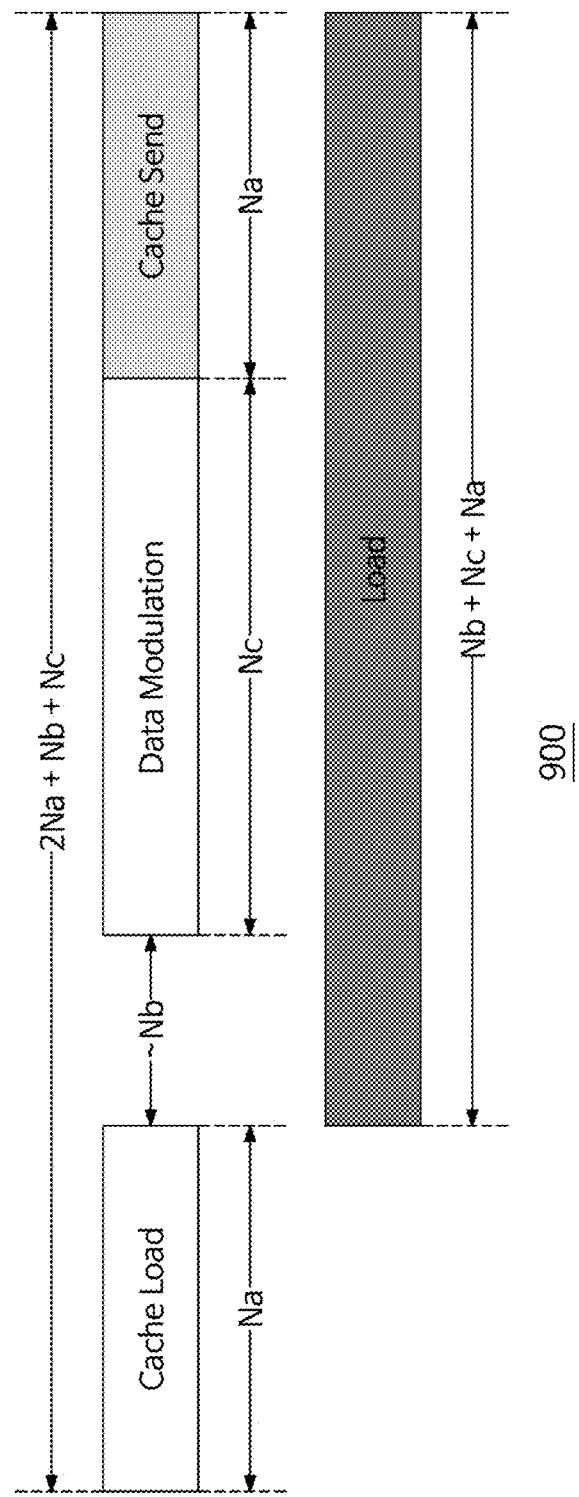
FIG. 9 is a diagram quantitatively illustrating increase in performance of the load unit.

FIG. 9 is a diagram quantitatively illustrating increase in performance of the load unit. In FIG. 9, Nb may be the idle time that occurs in the load unit when no parallel task is performed. As illustrated in FIG. 9, when a plurality of tasks associated with a plurality of burst load instructions are performed in parallel, the load unit may perform additional work during (Nb+Nc+Na), thereby significantly improving the performance of the processing system.

Figure 10:
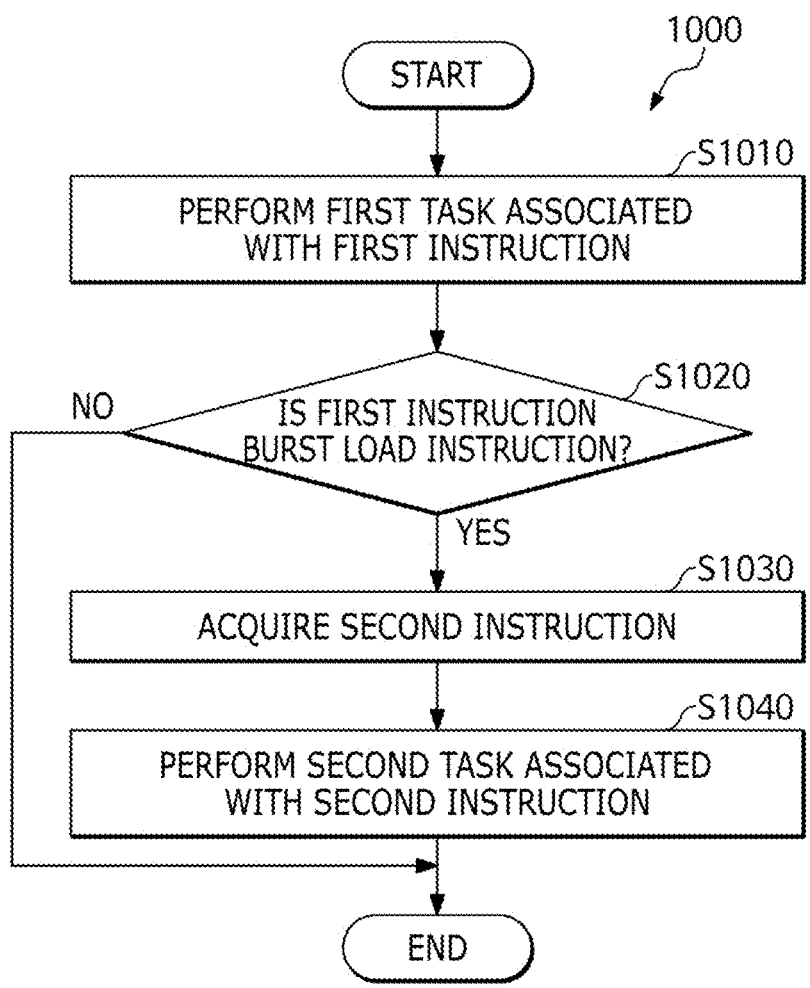
FIG. 10 is a flowchart provided to explain a method for processing tasks in parallel.

FIG. 10 is a flowchart provided to explain a method 1000 for processing tasks in parallel. The method illustrated in FIG. 10 is merely one example for achieving the object of the present disclosure, and it goes without saying that certain steps may be added or omitted as needed. In addition, the method illustrated in FIG. 10 may be performed by at least one processor included in the core SoC. For example, the method illustrated in FIG. 10 may be performed by a processor associated with the load unit included in the core SoC. For convenience of explanation, it will be described that each step illustrated in FIG. 10 is performed by the processor included in the core SoC illustrated in FIG. 3.

The processor may perform the first task associated with the first instruction, at S1010.

If the first task is performed, the processor may determine whether the first instruction is the burst load instruction, at S1020.

In response to determining that the first instruction is the burst load instruction, the processor may acquire the second instruction, at S1030. The first task and/or the second task may be generated in a pipeline structure that includes a plurality of instructions associated with generating a plurality of requests and a plurality of instructions associated with executing the plurality of requests. The instructions associated with generating the request are illustrated as BST in FIGS. 7 and 8, and the instructions associated with executing the request are illustrated as WB in FIGS. 7 and 8.

The processor may perform a second task associated with the acquired second instruction, at S1040. At this time, the processor may perform the first and second tasks in parallel. The acquired second instruction may be a burst load instruction, and the difference between the burst size of the second instruction and the burst size of the first instruction may be within a threshold range. In this case, the processor may generate a plurality of requests based on the burst size of the second instruction. The processor may identify a destination associated with the second instruction and store the generated plurality of requests in the request queue of the plurality of request queues which is associated with the identified destination. Next, the processor may identify, from among a plurality of storage areas, a storage area associated with the identified destination, and store the issued data in the identified storage area based on the request stored in the request queue associated with the destination.

The second task may start after a predetermined cycle from the cycle in which the first task starts. That is, the processor may be configured to start the second task at a predetermined time after the first task starts.

After performing the second task, the processor may acquire a third instruction and perform a third task associated with the acquired third instruction. The processor may perform each of the first, second, and third tasks in parallel. In response to determining that a burst load instruction with a different destination from each of the first instruction and the second instructions is waiting, the processor may determine the waiting burst load instruction to be the third instruction. For example, the processor may determine the waiting load instruction to be the third instruction, if a waiting load instruction associated with the burst load instruction is acquired.

In addition, the processor may start the third task by fetching the determined third instruction and decoding the fetched third instruction. Each of the first instruction, the second instruction, and the third instruction may be an instruction with a different destination.

It may be controlled such that the second task and the third task may start before the fourth task for modulating data written in the cache is performed.

The processor may perform the fourth task to modulate written data in response to the data being written to the cache. At this time, the processor may control such that the second task and the fourth task are performed in parallel.

The flowchart and description described above are merely examples, and may be implemented differently in some examples. For example, in some examples, the order of respective steps may be changed, some steps may be repeatedly performed, some steps may be omitted, or some steps may be added.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or marking data storage devices, etc. The instructions may be executable by one or more processors, and may cause the processor(s) to perform certain aspects of the functions described in the present disclosure.

If implemented in software, the techniques described above may be stored on a computer-readable medium as one or more instructions or codes, or may be sent via a computer-readable medium. The computer-readable media include both the computer storage media and the communication media including any medium that facilitates the transmission of a computer program from one place to another. The storage media may also be any available media that may be accessible to a computer. By way of non-limiting example, such a computer-readable medium may include RAM, ROM, EEPROM, CD-ROM or other optical disk storage, magnetic disk storage or other magnetic storage devices, or any other media that can be used to send or store desired program code in the form of instructions or data structures and can be accessible to a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor, such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method for processing tasks in parallel, the method being performed by at least one load unit of a processor and comprising:
   fetching a first instruction;
   determining whether the first instruction is a burst load instruction;
   in response to determining that the first instruction is a burst load instruction, fetching a second instruction, wherein the first instruction is a first burst load instruction for loading data to a first destination, the second instruction is a second burst load instruction for loading data to a second destination different from the first destination, the first burst load instruction is associated with a first task, the second burst load instruction is associated with a second task, and the second task is independently executable from the first task;
   determining whether a burst size of the first burst load instruction is greater than a predetermined threshold;
   in response to determining that the burst size of the first burst load instruction is greater than a predetermined threshold, performing the second task in parallel with the first task, wherein performing the first task includes generating a first set of requests, performing the second task includes generating a second set of requests based on the burst size of the second burst load instruction, a duration during which the second set of requests is generated is not overlapped with a duration during which the first set of requests is generated, and the duration during which the second set of requests is generated is overlapped with a waiting time occurring when reading data based on the first set of requests; and
   in response to determining that the burst size of the first burst load instruction is less than the predetermined threshold, performing the first task without performing the second task in parallel with the first task.

2. The method according to claim 1, wherein a difference between the burst size of the second burst load instruction and the burst size of the first burst load instruction is within a threshold range.

3. The method according to claim 2, wherein the second task is generated in a pipeline structure that includes a plurality of instructions associated with the generating the second set of requests and a plurality of instructions associated with executing the second set of requests.

4. The method according to claim 2, wherein the generating the second set of requests includes:
    identifying the second destination associated with the second burst load instruction; and
    storing the generated second set of requests in a request queue, which is associated with the identified second destination, of the plurality of request queues.

5. The method according to claim 4, further comprising, after the generating the second set of requests:
    identifying a storage area, which is associated with the identified second destination, of a plurality of storage areas; and
    storing, in the identified storage area, data issued based on the requests stored in the request queue associated with the second destination.

6. The method according to claim 1, wherein the second task starts after a predetermined cycle from a cycle in which the first task starts.

7. The method according to claim 1, further comprising, after the performing the second task:
    acquiring a third instruction; and
    performing a third task associated with the acquired third instruction,
    wherein the first task and the third task are performed in parallel.

8. The method according to claim 7, wherein the second task and the third task start before a fourth task for modulating data written in a cache is performed.

9. A processing system comprising:
    a memory that stores data associated with at least one instruction; and
    at least one load unit of a processor configured to perform an access operation to the memory,
    wherein the at least one load unit is configured to:
    fetching a first instruction;
    determining whether the first instruction is a burst load instruction;
    in response to determining that the first instruction is a burst load instruction, fetching a second instruction, wherein the first instruction is a first burst load instruction for loading data to a first destination, the second instruction is a second burst load instruction for loading data to a second destination different from the first destination, the first burst load instruction is associated with a first task, the second burst load instruction is associated with a second task, and the second task is independently executable from the first task,
    determine whether a burst size of the first burst load instruction is greater than a predetermined threshold,
    in response to determining that the burst size of the first burst load instruction is greater than a predetermined threshold, perform the second task in parallel with the first task, wherein performing the first task includes generating a first set of requests, performing the second task includes generating a second set of requests based on the burst size of the second burst load instruction, a duration during which the second set of requests is generated is not overlapped with a duration during which the first set of requests is generated, and the duration during which the second set of requests is generated is overlapped with a waiting time occurring when reading data based on the first set of requests, and
    in response to determining that the burst size of the first burst load instruction is less than the predetermined threshold, perform the first task without performing the second task in parallel.

10. The processing system according to claim 9, wherein, in response to determining that the burst size of the first burst load instruction is greater than a predetermined threshold, the at least one load unit is configured to fetch an instruction associated with the second task and decode an instruction associated with the fetched second task.

11. The processing system according to claim 9, wherein a difference between the burst size of the first burst load instruction and the burst size of the second burst load instruction is within a threshold range.

12. The processing system according to claim 11, wherein the second task is generated in a pipeline structure that includes a plurality of instructions associated with the generating the second set of requests and a plurality of instructions associated with executing the second set of requests.

13. The processing system according to claim 11, wherein the at least one load unit is configured to identify the second destination associated with the second task and store the generated second set of requests in a request queue, which is associated with the identified second destination, of a plurality of request queues.

14. The processing system according to claim 13, wherein the at least one load unit is configured to identify a storage area, which is associated with the identified second destination, of a plurality of storage areas and store, in the identified storage area, data issued based on the second set of requests stored in the request queue associated with the second destination.

15. The processing system according to claim 9, wherein the at least one load unit is configured to additionally acquire an instruction and perform a third task associated with the acquired instruction, and perform the third task and the first task in parallel.

16. The processing system according to claim 15, wherein the at least one load unit is configured to start the second task and the third task before performing a fourth task for modulating data written to a cache.

* * * * *